United States Patent [19]

Molvar

[11] 4,229,302

[45] Oct. 21, 1980

[54] WASTE TREATMENT APPARATUS WITH FLOATING PLATFORM

[75] Inventor: Allen E. Molvar, Barrington, R.I.

[73] Assignee: Clevepak Corporation, White Plains, N.Y.

[21] Appl. No.: 953,215

[22] Filed: Oct. 20, 1978

[51] Int. Cl.² .............................................. C02C 5/10
[52] U.S. Cl. .................................. 210/220; 210/237; 210/242 A; 261/29; 261/120; 261/DIG. 75
[58] Field of Search ............. 261/29, 36 R, 120, 124, 261/77, DIG. 47, DIG. 75; 210/3, 7, 14, 15, 16, 170, 220, 242 A, 237, 249

[56] References Cited

U.S. PATENT DOCUMENTS

| | | | |
|---|---|---|---|
| 2,172,646 | 9/1939 | Walker | 261/36 R |
| 2,825,541 | 3/1958 | Moll | 261/124 |
| 3,515,377 | 6/1970 | Ray | 261/36 R |
| 3,622,132 | 11/1971 | Rawlings | 261/DIG. 47 |
| 3,671,022 | 6/1972 | Laird | 210/170 |
| 3,756,578 | 9/1973 | McGurk | 261/120 |
| 3,799,511 | 3/1974 | Svantesson | 261/120 |
| 3,810,548 | 5/1974 | Blough | 210/242 A |
| 3,846,517 | 11/1974 | Ross | 210/242 A |
| 3,852,384 | 12/1974 | Bearden | 261/77 |
| 3,855,367 | 12/1974 | Webb | 261/77 |
| 3,923,649 | 12/1975 | Sparham | 210/20 |
| 4,030,859 | 6/1977 | Henegur | 210/242 A |
| 4,044,079 | 8/1977 | Tveit | 261/124 |

FOREIGN PATENT DOCUMENTS

| | | | |
|---|---|---|---|
| 942754 | 11/1963 | Canada | 261/DIG. 75 |
| 2447337 | 4/1976 | Fed. Rep. of Germany | 210/220 |

*Primary Examiner*—Ernest G. Therkorn
*Attorney, Agent, or Firm*—Cushman, Darby & Cushman

[57] ABSTRACT

An apparatus for treatment of waste water in a body such as a lagoon in which a submerged aeration device is suspended from a floating platform. Air is supplied to the aeration device by a conduit passing through the buoyant base of the platform to a central opening so that the conduit is an integral, structural part of the platform.

14 Claims, 2 Drawing Figures

WASTE TREATMENT APPARATUS WITH FLOATING PLATFORM

BACKGROUND OF THE INVENTION

The invention relates to an apparatus for the treatment of waste water.

Waste water in a body such as a lagoon or a tank is typically treated by mixing air into the waste water. This air supports biological processes which change the waste water so that it can be returned to a stream, lake or larger body. A variety of mechanical and other aeration devices are available and typically such devices are mounted at the edge of the tank or lagoon, form a part of the bottom or sides thereof, or are suspended from fixed beams or the like over the tank or lagoon.

Floating surface aerators which spray waste water into the air to absorb atmospheric oxygen are inefficient, and accelerate thermal losses in the winter which leads to biological process failures and creates icing and freezing problems leading to mechanical failures. Moreover, floating aerators cannot be used in deep basins because of poor bottom mixing in the tank or lagoon. High maintenance costs are usually required.

Submerged aeration devices conserve thermal energy, thereby enhancing cold weather operation. They are free from icing and more efficient with greater mechanical reliability than surface aerators.

However, one drawback of submerged aerators has been the need to drain the tank or pond for installation and maintenance.

Suggestions have been made for a submerged aeration device which mixes a gas with waste water and is supported beneath the surface of the body of that waste water by a floating platform providing sufficient buoyancy to support the aeration device. The use of a floating platform provides considerably greater flexibility in positioning the aeration device to achieve maximum efficiency and results than fixed devices.

However, several problems have been encountered in using floating platforms to suspend aeration devices. One of the problems is platform stability. The aeration device creates considerable water and air movement and may create violent bubbling beneath the work platform with the water and bubbles rising and shaking the platform. An unstable platform normally leads to a reduction in efficiency of the aeration device which is shaken with the platform.

The present invention relates to a unique apparatus including a floating work platform for supporting and suspending an aeration device or the like in a stable and satisfactory manner.

One type of aeration device which is particularly satisfactory with the present invention is the jet aerator. Such a device typically includes a plurality of nozzles through which waste water is pumped with air being mixed with the waste water within each nozzle.

According to one aspect of the present invention, a conduit is used to connect a source of pressurized gas above the surface of the body of the water to the aeration devices which are disposed below the surface of the body of the water. In order to stabilize the platform and to make sure that the conduit is not a source of hazard to those who work on the platform, the conduit extends through the base of the floating platform, preferably at the water level and preferably to a central opening through the platform. The conduit then connects to the aeration devices suspended by a cable or the like through the central opening. The conduit thus acts as an outrigger, providing stability and forming an integral structural part of the platform.

The use of mixing devices of this type and particularly the use of jet aerators produces considerable upward flow of the water and entrained gases. At least some of the gases will escape from the surface of the body. Since the devices are suspended beneath the work platform, it is inevitable that a considerable amount of the water and gas flow will impinge beneath the platform. In one respect this can be an advantage, since if the gases are trapped as small bubbles for at least a short time beneath the platform, their residence time in contact with the water increases and the amount of absorption increases as well. However, if large bubbles form beneath the platform, the air surface in contact with the water is too small to effectively increase residence time. Further, these large bubbles cause the platform to become unstable. It has been found that formation of such large bubbles can be avoided, and the platform at the same time will effectively trap the small bubbles, if the dimensions of the aerating device are related to the dimensions of the platform.

More particularly, the present invention finds particular utility with a jet aeration device comprising a plurality of nozzles extending radially outward from a manifold containing both pressurized gas and waste water which is pumped therein. The waste water flows in a radially outward direction through the nozzles and air is mixed with the waste water as it passes through the respective nozzles. With such a device, it has been found that if the distance between the outlets of the most separated nozzles is at least as great as the smallest dimension of the floating work platform in the horizontal plane, large bubbles will not form and the residence time will be advantageously increased.

The co-pending application of the present applicant, Ser. No. 863,587, filed Dec. 22, 1977, now U.S. Pat. No. 4,152,259, describes a method and apparatus of backflushing a system such as described in the present invention. In this backflushing technique the pump which forces waste water through the nozzles is turned off while the air pressure is continued. The air then flushes the waste water in a reverse direction through the pump or through a separate connection, removing debris and the like which interfere with effecient operation of the system. This backflushing technique, particularly when it is done through the pump, creates great upwelling of water and entrained bubbles which can violently shake the raft. However, this problem has been resolved in the present invention by providing a central opening in the base through which the upwelling waves can dissipate their energy to the surface. The central opening has a cross-sectional area at least as great as the pump inlet area. Further, the central opening provides a simple and convenient way to suspend the aeration device beneath the platform and retrieve the device for maintenance.

As described below, the present invention includes a number of additional aspects which make the system efficient, stable and desirable. The base is preferably closed on all sides and filled with a suitable foam to provide buoyancy. The submerged aeration device is preferably supported and stabilized by means of a plurality of vertically extending guide bars, e.g., four. An A-frame support is mounted on the platform and the aeration device suspended from this A-frame support by means of a cable and winch.

Other objects and purposes will be clear from the following detailed description of the drawings.

DETAILED DESCRIPTION OF THE DRAWINGS

Figure 1:
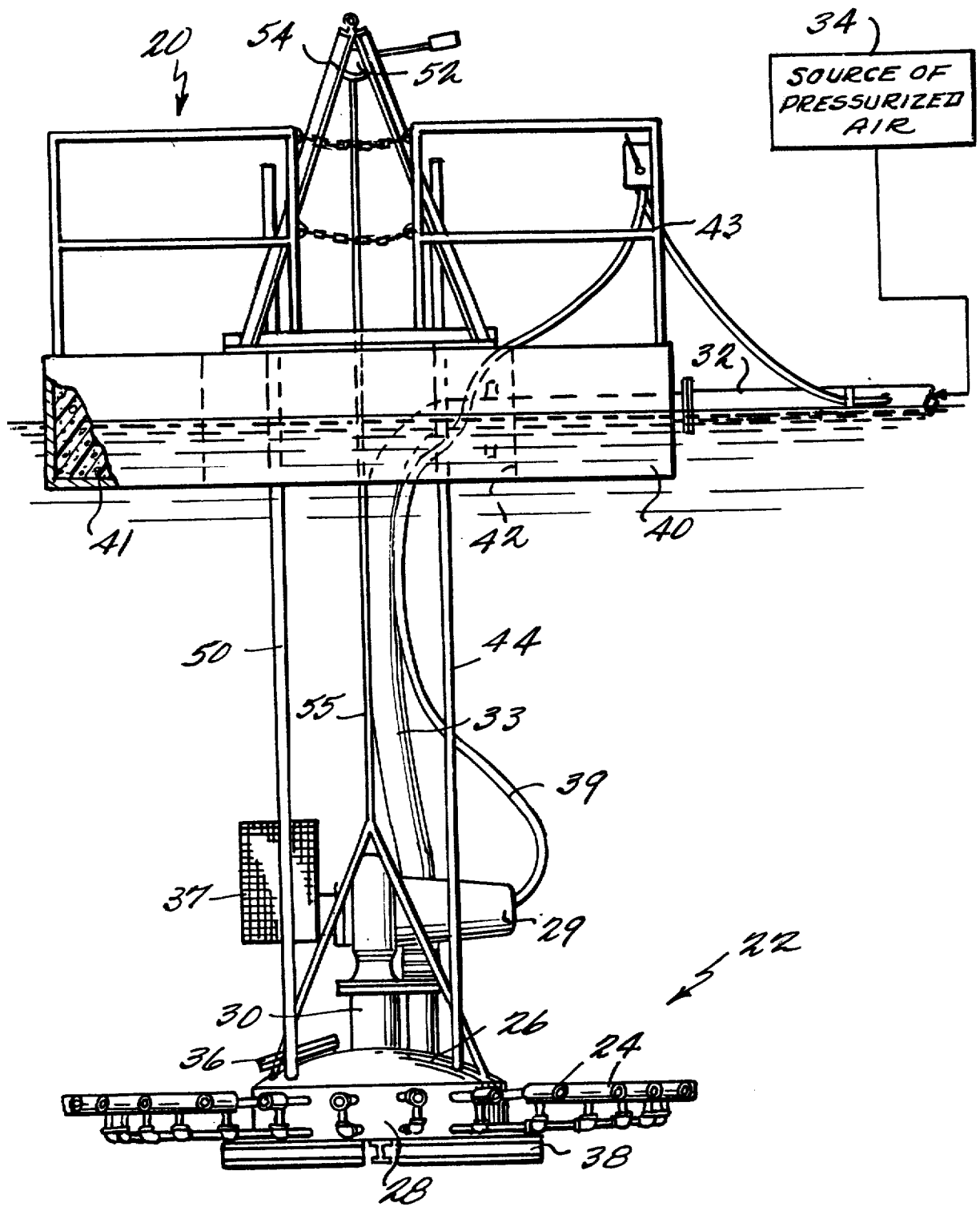
FIG. 1 shows a side view of the floating platform and aeration apparatus suspended therefrom.
Figure 2:
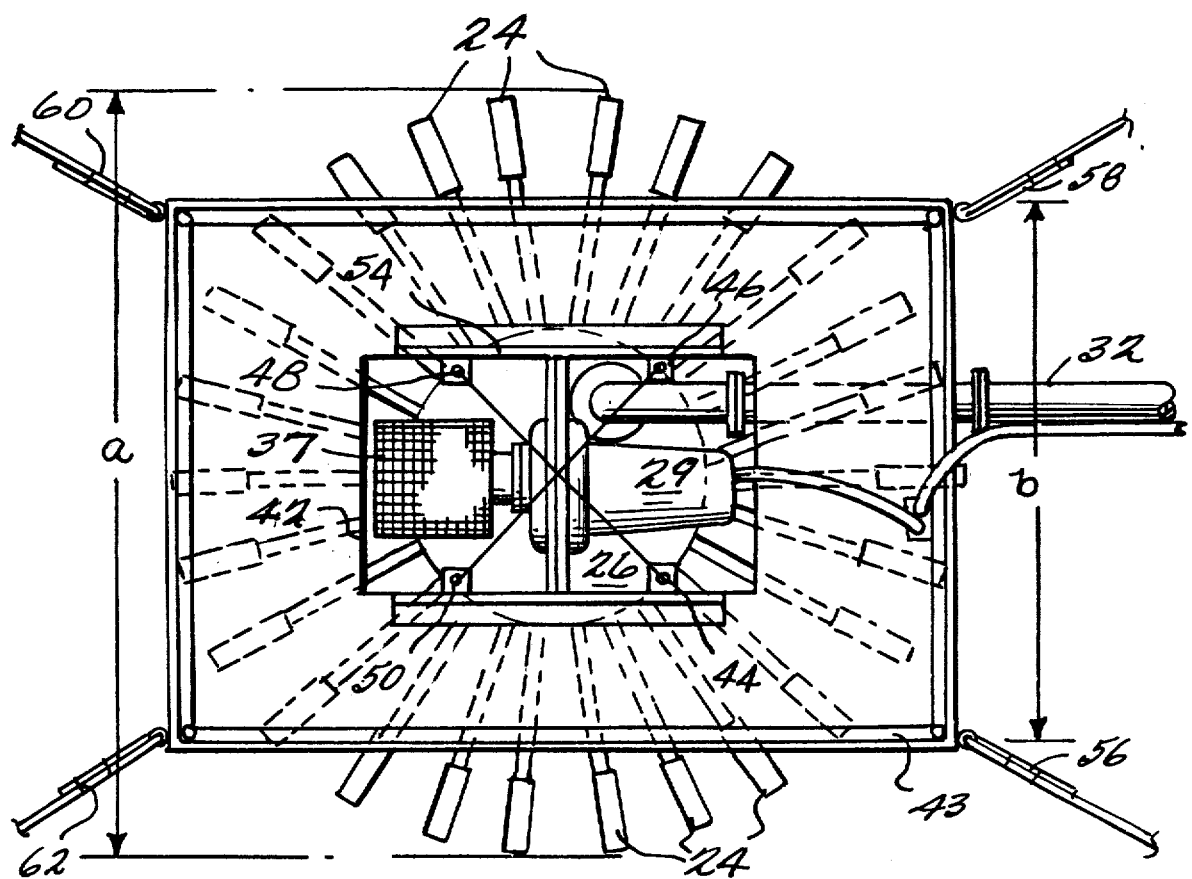
FIG. 2 shows a top view of the platform and aeration apparatus of FIG. 1.

Reference is now made to FIGS. 1 and 2 which illustrate an embodiment of the invention. The system of the present invention comprises a floating platform 20 and an aeration device 22 which is adjustably suspended therefrom in a body of waste water. Aeration device 22 is comprised of a plurality of jet aerators 24, for example, twenty-six jet aerators radially extending outward from a water manifold 26 having a dome upper surface with an access port 36. The dome surface withstands the upward pressure of the water and supports the heavy pump above it. A bottom bracket 38 allows device 22 to sit on the bottom of the body if desired. Access port 36 allows epoxy coating the interior surfaces of the dome during fabrication and removal of tools and debris after welding.

Water is pumped radially outward through an internal passage in each of these jet aerators. Air from a second manifold 28 disposed below manifold 26 and separated therefrom by a suitable partition or diaphragm (not shown) is injected into each of the nozzles to form parallel water and air streams. The interface between these two streams in the nozzle passage becomes unstable, creating vortices and formation of tiny bubbles which are intimately and efficiently mixed with the water being pumped through the passage. The operation of this type of jet aerator and detailed structure thereof are further described in U.S. Pat. Applications Ser. No. 863,588 filed Dec. 22, 1977, now U.S. Pat. No. 4,157,304, and Ser. No. 863,587, filed Dec. 22, 1977, now U.S. Pat. No. 4,152,259, both the invention of the present applicant and in Ser. No. 598,871, filed July 24, 1975, the co-invention of the present applicant and a second inventor. The disclosure of each of these applications is hereby incorporated by reference into the present application.

Water is supplied to the manifold by a conventional submersible pump 29, for example, a 14 horsepower submersible pump, via a neck portion conduit 30. Screen 37 covers the pump inlet and filters debris in the body. Electric line 39 powers pump 29. Air is supplied to the manifold 28 via conduit 32 from a source of pressurized air shown schematically as source 34 and located above the surface of the water, for example, on land.

The present invention is not limited to this specific type of jet aeration equipment, although it finds particular utility in that combination. Other types of aerators, for example, Venturi type aerators, can alternatively be employed as can other types of aerators which do not use a jet principle.

Platform 20 is designed and includes a number of features which make the platform a stable, desirable, and effective support for suspending an aeration device. Base 40 provides the positive buoyancy required to support the aeration device 22. Base 40 is preferably closed on the top, bottom and all sides and contains conventional foam material 41 part of which can be seen in the partially broken away part of FIG. 1. Since the bottom is closed, the waste water cannot break down foam material 41. Any suitable foam can be employed. Safety rails 43 extend about the top surface of base 40. Base 40 can be made of any suitable material, and fibreglass over a metal frame has been found to be particularly satisfactory.

Conduit 32 extends through the interior of hollow base 40 between peripheral surface and the central opening and is a structural part of base 40. Conduit 32 is fibreglass sealed where it enters and leaves the interior of base 40, and is preferably arranged so that its center line is located at the water line. Thus, the pipe exerts no force on the platform, and it functions like an outrigger to increase the stability of the platform.

Base 40 is provided with a rectangular central opening 42 exposing the waste water surface to the atmosphere. This opening is desirable to prevent rolling and pitching of the platform during operation and particularly during back-flush operation in which considerable flow of water and entrained air in an upward direction occurs. In addition, the platform is preferably dimensioned so that its smallest dimension is at least equal to the nozzle to nozzle dimension of the aeration unit. In order to provide stability, the cross-sectional area of opening 42 must be as large as the intake area of the pump. A platform so dimensioned provides an effective aeration pattern since some of the aerated stream is trapped under the floating platform as small bubbles to cap and increase residence time and absorption. However, if the aeration unit is too small, then large pockets of air tend to form underneath the platform, reducing absorption and decreasing efficiency. It has been found that this is avoided if the distance a from the outlets of the most separated nozzles is at least about equal to or greater than the small horizontal platform dimension b. In the illustrated embodiment the distance a is considerably larger than distance b. The distance a can be slightly smaller then b, perhaps a few feet smaller, when higher jet velocities are used.

Aeration unit 22 is connected to the platform by four stabilizing bars 44, 46, 48 and 50 which are welded to the dome upper surface of manifold 26 and can be readily adjusted on the platform to move the aeration unit in a vertical direction. Bars 44, 46, 48 and 50 prevent rotation rolling and pitching. At least two bars are needed and four are preferred. Winch 52 is suspended from an A-frame 54 made of aluminum and connected to the dome 26 by cable 55 at four separated locations which are joined above the center of gravity of the submerged unit as shown. The A-frame retrieval winch 52 allows aeration device 22 to be raised high enough for maintenance. Thus, to move the aeration unit up and down it is only necessary to use the winch. Guy wires 56, 58, 60 and 62 attach platform 20 to solid supports for wind stabilization (not shown).

Many changes and modifications in the above-described embodiments can be made without departing from the scope of the present invention, such scope being intended to be limited only by the scope of the appended claims.

What is claimed is:

1. An apparatus for treatment of waste water in a body of waste water comprising:
    means for mixing a gas with said waste water including a water manifold, a gas manifold, a plurality of nozzles extending outward from said water manifold and connected to said gas and water manifolds with water passing through each nozzle from inlet to outlet and gas being mixed with water in said nozzle, means including a pump for pumping said waste water into said water manifold, means for supplying said gas to said gas manifold;

a floating platform including a base closed on all sides and providing bouyancy for floating in a horizontal plane, said base having a central opening between the atmosphere and the surface of said body and exposing said surface to the atmosphere, the distance between the outlets of the most separated nozzles being about no less than the least dimension of the base in said horizontal plane;

means mounted on said platform and extending through said opening for suspending said mixing means from said platform, the cross-sectional area of said opening being sufficient to withdraw said pump therethrough to a position above said platform and being at least as great as the intake area of said pump; and means for supplying said gas to said mixing means and forming a structural part of said platform, said supplying means comprising a conduit extending into said opening and horizontally through said base between said central opening and a peripheral surface to increase the stability of said platform.

2. An apparatus as in claim 1, wherein said conduit extends through said base with its center line at roughtly the waterline.

3. An apparatus as in claims 1 or 2 including foam material filling said base to provide said buoyancy.

4. An apparatus as in claims 1, or 2 including a source of pressurized gas connected to said gas supplying means.

5. An apparatus as in claims 1, or 2, wherein said base is fibreglass over a metal frame.

6. An apparatus as in claim 1, wherein said suspending means includes a plurality of vertically extending guide bars connecting said mixing means to said platform.

7. An apparatus as in claim 6, wherein said suspending means includes an A-frame support on said platform, a cable suspending said mixing means from said A-frame support, and a winch for vertically moving said mixing means.

8. An apparatus as in claim 6, including four said guide bars.

9. An apparatus as in claims 1, 6, or 7, further including safety rails on the upper surface of said platform.

10. An apparatus as in claim 1, wherein said nozzles extend radially outward from said water manifold, and wherein said pump is mounted above said water manifold in said body.

11. An apparatus as in claim 10, further including a screen covering the inlet of said pump.

12. An apparatus as in claim 10, wherein said gas manifold is below said water manifold and the upper surface of said water manifold is a dome having an access port.

13. An apparatus as in claim 12, including a self-supporting bracket below said gas manifold for supporting said mixing means on the bottom of said body.

14. An apparatus as in claim 1 further including a screen.

* * * * *